F. G. HIRST.
LUBRICATOR.
APPLICATION FILED MAY 20, 1919.

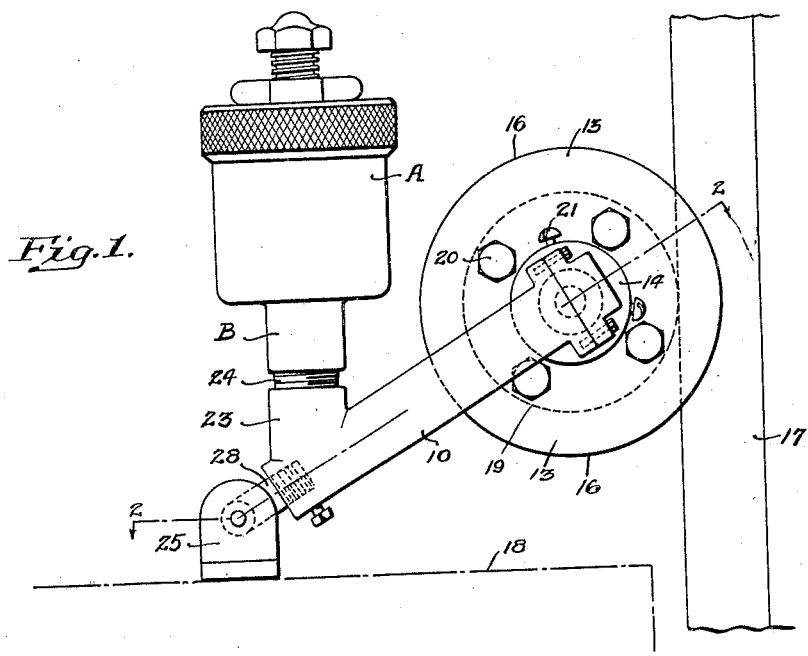
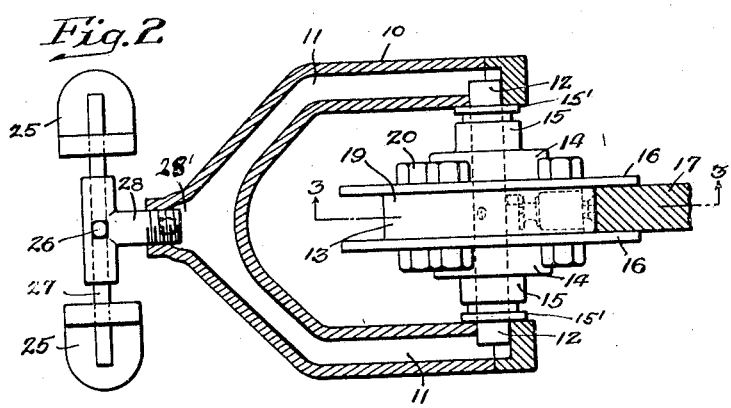
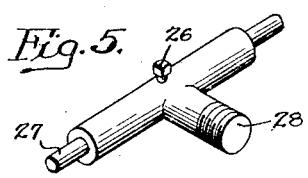
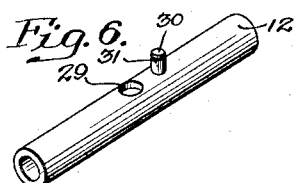

1,327,043.

Patented Jan. 6, 1920.
2 SHEETS—SHEET 2.

Inventor:
Franklin G. Hirst
by M. van Bosskirk
his Attorney

UNITED STATES PATENT OFFICE.

FRANKLIN G. HIRST, OF PHILADELPHIA, PENNSYLVANIA.

LUBRICATOR.

1,327,043.  Specification of Letters Patent.  Patented Jan. 6, 1920.

Application filed May 20, 1919. Serial No. 298,362.

*To all whom it may concern:*

Be it known that I, FRANKLIN G. HIRST, a citizen of the United States, residing at Philadelphia, in the county of Philadelphia and State of Pennsylvania, have invented certain new and useful Improvements in Lubricators, of which the following is a specification.

My invention pertains to devices for lubricating vertical surfaces and is particularly adaptable for operation on the guide rails of elevators, cables and the like, but is not necessarily limited thereto.

The objects of my invention are to provide a device of the class described whereby an even and certain distribution of the lubricant to the surface of the object to be lubricated is effected, thereby tending to economical and exact lubrication; to provide a device that is prevented from displacement or interruption to its feeding by reason of any lateral or other movement of the object to be lubricated, and a device, the various parts of which, can easily be removed or replaced in case the necessity or advisability of such replacement or removal occurs.

With these and other objects in view the invention consists in the construction, combination and arrangement of parts all as hereinafter more fully described, claimed and illustrated in the accompanying drawings, wherein:—

Figure 1 is a perspective view of the lubricator illustrating same in operative position on the guide rail of an elevator;

Fig. 2 is a horizontal sectional view of the device on line 2—2 of Fig. 1;

Fig. 5 is a detail view of the T shaped member used to connect the yoke with the supports;

Fig. 6 is a detail view of the hollow shaft forming the axle of the wheel; and

Like reference characters refer to like parts throughout the drawings.

Reference being had to the accompanying drawings the numeral 10 indicates a bifurcated arm or yoke having the conduit or duct 11 therein extending completely therethrough, the ends of said yoke being closed and are adapted to span at either end the axle 12 of a wheel 13 and to be secured thereto.

Figure 3:
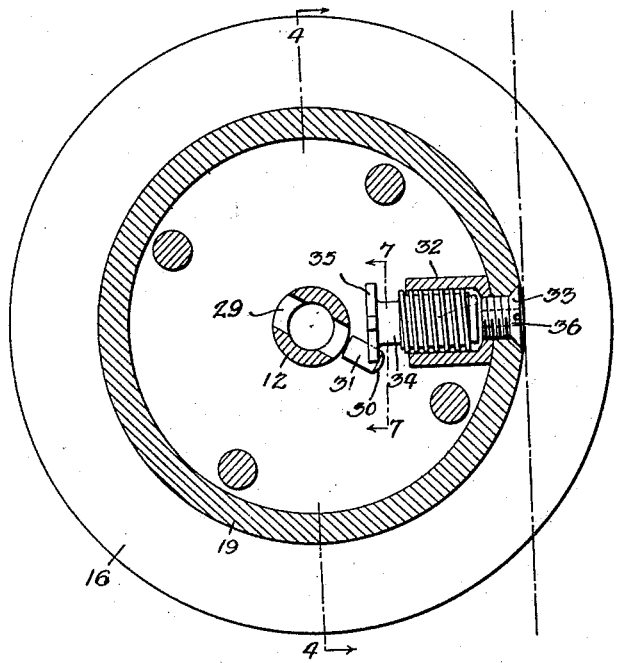
Fig. 3 is a sectional perspective view of the screw mechanism to be actuated by the roller on the hollow shaft on line 3—3 of Fig. 2.
Figure 4:
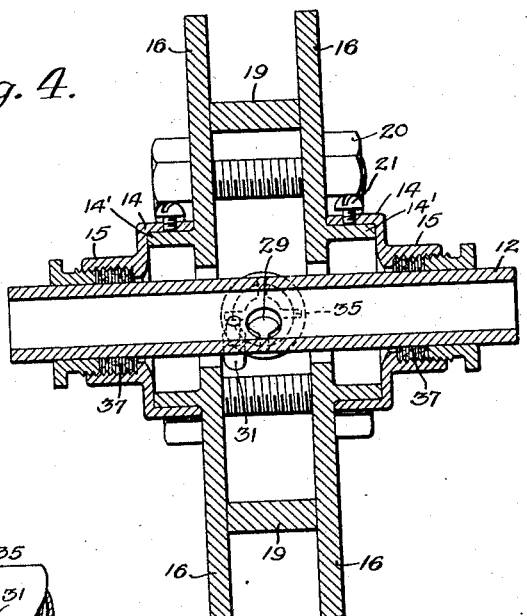
Fig. 4 is a vertical sectional view of the wheel on line 4—4 of Fig. 3.
Figure 7:
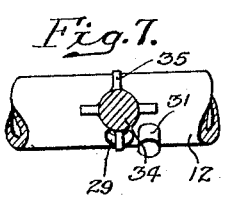
Fig. 7 is a plan view on line 7—7 of Fig. 3.

Said wheel 13 is constructed as particularly illustrated in Fig. 4 and is provided with the hubs 14' (Fig. 2) formed by integral projections from the flanges 16, the flanges 16 adapted to span the object to be lubricated herein illustrated as a guide rail 17 of an elevator 18, and the circular member 19 the outer periphery of which acts as the tread or portion that is brought into contact with the guide rail 17, or other object to be lubricated.

Bolts 20 extend through the flanges 16 and the circular member 19 securing same firmly together and affording means for easily disassembling same.

Caps or covers 14 are provided on the hubs 14' and have the horizontally extending reduced sections 15 to lengthen the hub structure and to provide space for packing nuts 15' whereby suitable packing 37 may be inserted between said extensions 15 and the shaft 12.

Said hub covers 14 are secured to the hub 14' by means of set screws 21, thus the covers 14 and the extensions 15 thereof may be readily removed whenever requisite or desirable.

The yoke 10 is provided with the vertical threaded opening 23 in which is threaded the nozzle B, by means of the threaded portion 24 of a grease cup A of any well known type adapted to feed grease to the conduit 11 by compression. An oil cup, or other supply means may be connected to said yoke 10 by any suitable means, if desired, adapted to feed oil to said conduit 11, either by compression or gravity.

The hollow shaft 12, forming the axle of the wheel 13, is secured in the ends of the yoke 10 as illustrated, but does not extend completely therein, thereby providing space for the admission of the lubricant from the conduit 11 in said yoke 10 to said hollow shaft 12.

Said shaft 12 is provided with the opening or port 29 and has thereon, adjacent to said port 29, a projection 30 on which is suitably mounted a roller 31.

A housing 32 is secured to the inner periphery of the member 19 and extends inwardly toward the center of the wheel. A screw 33 is positioned loosely within said housing 32 the head of said screw normally resting against the open end of said housing 32 and the base thereof terminating in a pronged ratchet 35 adapted to be rotated by the roller 31 on the shaft 12.

Said screw 33 being in line with said shaft 12 its inward travel is limited and it cannot entirely leave the housing 32. An opening or port 36 extends from substantially the center of the base of the housing 32 through the member 19.

The device is secured to the body of the object to be lubricated, herein illustrated as the top of an elevator 18 by means of a T shaped member 28 threaded to engage the threaded opening 28' in the yoke 10. A bar 27 passes through the outer arm of said member 28 and is loosely journaled at either end in the supports 25 adapted to be secured to the elevator 18.

Said bar 27 is rigidly secured to the aforesaid arm by means of the set screw 26 and space is provided between the ends of said arm and the supports 25 to permit of sufficient play or lateral movement of said member 28 and therefore of the lubricator, to equalize the lateral movement of the elevator, or body of the object to be lubricated.

In operation: The device is secured to the body of the object to be lubricated in the manner above described, the flanges 16 spanning the rail 17 and the outer periphery or tread of the member 19 of the wheel 13 is brought into contact with said rail. It will be noted that when the wheel 13 is in operative position and the tread is in contact with the rail 17, that said rail 17 and the receptacle A containing the lubricant to be applied to said rail are in a parallel position with each other and that the yoke 10, connecting said wheel and said receptacle, extends at an inclined angle from its point of connection with said receptacle of substantially 60°, thereby preventing the dislodgement of said receptacle or interruption to its feeding by any jolt or other vertical movement of the object to be lubricated; this position also prevents the non-rotation of said wheel on the rail 17 and affords it a greater tractive force, enabling it to rotate at any movement of the elevator, even though the surface of the rail 17 be ragged or uneven, and the hereinbefore described method of connecting the device with the body of the device to be lubricated prevents displacement of said wheel by reason of any lateral sway or movement of the car. The lubricant is fed by compression, or gravity, from the receptacle A into and through the conduit 11 in the yoke 10 and into the hollow shaft 12 forming the axle of the wheel 13. Said shaft 12 does not rotate. As the wheel 13 is rotated by the upward movement of the elevator the roller 31 on said shaft 12 engages the prongs of the ratchet 35 thereby rotating the screw 33 forcing same inwardly and away from its base against the opening of the housing 32. The lubricant is discharged from the hollow shaft 12 through the opening or port 29 therein and passes between the prongs of the ratchet 35 and by the screw 33 in the housing 32 to the surface of the object to be lubricated by the opening 36 in the member 19, so that at each revolution of the wheel 13 a jet of lubricant is applied to the rail 17. As the wheel continues its revolution the surface of the outer periphery of the member 19 will spread the lubricant along the surface of said rail providing a uniform and economical distribution of said lubricant. This spreading action of the member 19 will also tend to distribute the lubricant on the side surfaces as well as the front surface of the rail 17.

As the elevator descends a reverse action of the screw 33 takes place it being forced firmly against its base sealing the outlet 36 to the rail 17 wherefore no lubricant can pass to said rail on the downward trip of the elevator. It will be obvious that the lubricant will not be applied to the rail when the elevator is not in motion.

By applying the lubricant only at each revolution of the wheel, instead of continuously a great saving of lubricant is effected.

Any lubricant, whether oil, grease or other substance that can be fed by compression or gravity may be applied by this lubricator.

A feature of novelty in the present device is the absence of springs so universally used to maintain the lubricator in contact with the object to be lubricated.

Various modifications may be made to the invention hereby disclosed without departing from the scope of said invention.

Having thus described my invention what I claim as new and desire to secure by Letters Patent is:—

1. In a device of the class described the combination of a yoke having a passage therein, a hollow shaft connected thereto, a revoluble cylinder mounted on said shaft, communicating outlets in said shaft and the outer periphery of said cylinder and means operable within said cylinder to emit lubricant therefrom at each forward revolution of said cylinder.

2. In a device of the class described the combination of a yoke having a continuous passage therein, means to connect said yoke with the body of the object to be lubricated to equalize any lateral movement thereof, comprising a T shaped member adapted to be threaded into a threaded opening in said yoke, a bar, extending through the outer arm of said T shaped member, journaled at either end, adjacent to the ends of said outer arm, in supports to be secured to said body, means to rigidly secure said bar in said outer arm, a hollow shaft connected to said yoke, a wheel rotatively mounted on said shaft and communicating outlets in said shaft and the tread of said wheel.

3. In a device of the class described, the combination of a yoke having a continuous passage therein, a hollow shaft connected thereto, a wheel rotatively mounted on said shaft, a housing mounted on the inner periphery of the tread of said wheel, a screw loosely positioned therein, the base thereof terminating in a pronged ratchet, means carried by said shaft to rotate said ratchet and communicating outlets in said shaft, housing and tread of said wheel.

4. In a device of the class described the combination of a yoke having a continuous passage therein, a hollow shaft connected thereto, a wheel rotatively mounted on said shaft, a housing mounted on the inner periphery of the tread of said wheel, a screw loosely positioned therein, the base thereof terminating in a pronged ratchet, means to rotate said ratchet whereby said screw is forced inwardly from its base during the forward revolutions of the wheel and communicating outlets in said shaft housing and the tread of said wheel, providing for a continuous passage of the lubricant at each revolution of said wheel.

5. In a device of the class described the combination of a yoke having a continuous passage therein, a hollow shaft connected thereto, a wheel rotatively mounted on said shaft, communicating outlets in said shaft and the tread of said wheel, a housing mounted on the inner periphery of said tread, a screw loosely positioned therein the base thereof terminating in a pronged ratchet, means to rotate said ratchet whereby said screw is forced outwardly against its base during the rearward revolutions of said wheel thereby sealing the said outlet in the tread of the wheel.

6. In a device of the class described the combination of a yoke having a continuous passage therein, a hollow shaft connected thereto, a wheel rotatively mounted on said shaft, a housing mounted on the inner periphery of the tread of said wheel, a screw loosely positioned therein its base terminating in a pronged ratchet, means to rotate said ratchet whereby said screw is forced inwardly during the forward revolutions of the wheel, communicating outlets in said shaft housing and the tread of said wheel, providing for a continuous passage of the lubricant, said screw being in line with said shaft its inward travel is limited and it cannot entirely leave the housing.

7. In a device of the class described the combination of a yoke having a continuous passage therein, a hollow shaft connected thereto, a wheel rotatively mounted on said shaft, a housing mounted on the inner periphery of the tread of said wheel, a screw loosely positioned therein the base thereof terminating in a pronged ratchet, means to rotate said wheel and ratchet whereby said screw is forced inwardly from its base during the forward revolutions of said wheel, communicating outlets in said shaft, housing and tread whereby at each revolution of said wheel a jet of lubricant is applied to the object to be lubricated, said lubricant being distributed by said tread.

8. In a device of the class described, the combination of a yoke having a continuous passage therein, a lubricant receptacle operatively connected therewith, a hollow shaft connecting the arms of said yoke, a revoluble cylinder mounted on said shaft and communicating outlets in said shaft and the tread of said cylinder providing for a continuous passage of the lubricant, said yoke extending from its point of connection with the lubricant receptacle to the axis of the cylinder at an upwardly inclined angle.

9. In a device of the class described, the combination of a yoke having a continuous passage therein, a lubricant receptacle operatively connected therewith, a hollow shaft connecting the arms of said yoke, a revoluble cylinder mounted on said shaft and communicating outlets in said shaft and the tread of said cylinder, providing for a continuous passage of the lubricant, said yoke extending from its point of connection with the lubricant receptacle to the axis of the cylinder at an upwardly inclined angle whereby said cylinder and said lubricant receptacle are maintained in a parallel position with each other and vertical displacement of said cylinder is prevented.

10. In a device of the class described, the combination of a yoke having a continuous passage therein, a lubricant receptacle operatively connected therewith, a hollow shaft connecting the arms of said yoke, a revoluble cylinder mounted on said shaft and communicating outlets in said shaft and the tread of said cylinder providing for a continuous passage of the lubricant, said yoke extending from its point of connection with the lubricant receptacle at an upwardly inclined angle to the axis of said cylinder whereby the combined weight of said lubricant receptacle and said cylinder will maintain said cylinder in tractive contact with the object to be lubricated.

In testimony whereof I affix my signature.

FRANKLIN G. HIRST.